United States Defensive Publication [19] (H) [11] T104,802

Parton [43] Nov. 6, 1984

[54] NONIONIC ALKYNYL COMPOUNDS AND APPLICATIONS THEREOF TO SILVER HALIDE PHOTOGRAPHY

[76] Inventor: Richard L. Parton, c/o Eastman Kodak Company, Rochester, N.Y. 14650

[21] Appl. No.: 581,938

[22] Filed: Feb. 21, 1984

Related U.S. Application Data

[63] Continuation of Ser. No. 510,146, Jul. 1, 1983, abandoned.

[51] Int. Cl.[3] ..... G03C 1/28

[52] U.S. Cl. ..... 430/600; 430/598

[57] ABSTRACT

A photographically useful alkynyl compound is disclosed which is nonionic under aqueous alkaline photographic processing conditions. The alkynyl compound is comprised of an alkynyl group attached to a methylene group through a divalent chalcogen or an imino group. The methylene group is activated by an electron withdrawing substituent. The alkynyl compounds are useful in direct positive internal latent image forming emulsions as nucleating agents and in negative working surface latent image emulsions to increase speed and/or contrast.

11 Claims, No Sheets Drawing,

82 Pages Specification

The file of this unexamined application may be inspected and copies thereof may be purchased (849 O.G. 1221, Apr. 9, 1968).